United States Patent [19]

Meier et al.

[11] Patent Number: 4,989,810
[45] Date of Patent: Feb. 5, 1991

[54] METHOD AND APPARATUS FOR INFLUENCING A LAMINAR TURBULENT BOUNDARY LAYER TRANSITION ON BODIES IN FLOW

[75] Inventors: Hans U. Meier; Alois Maier, both of Göttingen, Fed. Rep. of Germany; Ming de Zhou, Nanjing, China

[73] Assignee: Deutsche Forschungs- und Versuchsanstalt für Luft- und Baumfahrt, Fed. Rep. of Germany

[21] Appl. No.: 272,627

[22] Filed: Nov. 17, 1988

[30] Foreign Application Priority Data

Nov. 12, 1987 [DE] Fed. Rep. of Germany ....... 3738366

[51] Int. Cl.⁵ .......................... F15D 1/12; H04R 9/06
[52] U.S. Cl. .................................................. 244/208
[58] Field of Search ............... 244/201, 204, 207, 208, 244/209, 205

[56] References Cited

U.S. PATENT DOCUMENTS

| | | | |
|---|---|---|---|
| 3,161,385 | 12/1964 | Kramer | 244/205 |
| 3,362,663 | 1/1968 | Wehrmann | 244/130 |
| 3,467,348 | 9/1969 | Lemelson | 244/208 |
| 4,693,201 | 9/1987 | Williams et al. | 244/130 |
| 4,741,498 | 5/1988 | Gerhardt | 244/130 |
| 4,753,401 | 6/1988 | Bechert | 244/207 |
| 4,786,020 | 11/1988 | Franke et al. | 244/130 |
| 4,802,642 | 2/1989 | Mangiarotty | 244/200 |
| 4,813,631 | 3/1989 | Gratzer | 244/209 |
| 4,848,701 | 7/1989 | Belloso | 244/207 |

FOREIGN PATENT DOCUMENTS

| | | |
|---|---|---|
| 0264144 | 4/1988 | European Pat. Off. . |
| 210498 | 10/1983 | Fed. Rep. of Germany . |
| 228939 | 11/1983 | Fed. Rep. of Germany . |
| 3316392 | 11/1984 | Fed. Rep. of Germany . |
| 320481 | 12/1984 | Fed. Rep. of Germany . |
| 3738366 | 5/1989 | Fed. Rep. of Germany . |
| 2188397 | 9/1987 | United Kingdom . |

OTHER PUBLICATIONS

DFVLR-AIAA-83-1673 Problems Associated with Artificial Boundry Layer Transition, by H. U. Meier, H. P. Kreplin.
Control of Laminar-Instability Waves Using a New Technique, by H. W. Liepmann, G. L. Brown and D. M. Nosenchuck.
AIAA-89-1005 Boundary Layer Transition Controlled by Flush Mounted Electro Acoustic Generators, by H. U. Meier, DNW & Zhou Ming de Nai.

Primary Examiner—Charles T. Jordan
Assistant Examiner—Richard W. Wendtland
Attorney, Agent, or Firm—Thomas & Kerr

[57] ABSTRACT

A method and an apparatus for influencing a laminar-turbulent boundary layer transition on bodies in flow is indicated. The disturbances are in this case introduced into the boundary layer in an unsteady manner. The disturbances are induced by blowing-out and sucking-off and/or by oscillations of the surface and/or by sound pressure.

21 Claims, 2 Drawing Sheets

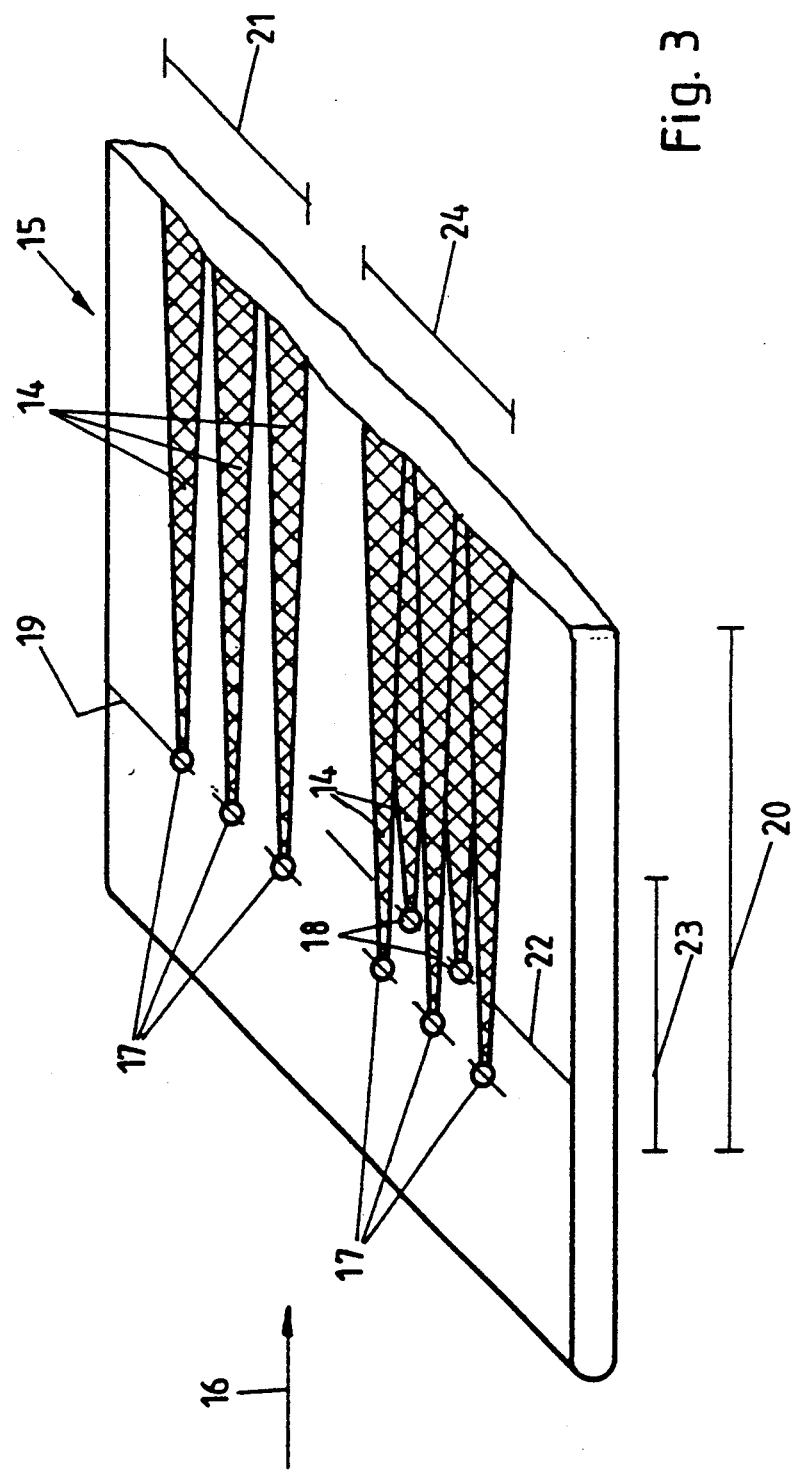

METHOD AND APPARATUS FOR INFLUENCING A LAMINAR TURBULENT BOUNDARY LAYER TRANSITION ON BODIES IN FLOW

BACKGROUND OF THE INVENTION

The invention is based on a method of influencing a laminar-turbulent boundary layer transition on bodies in flow, in which disturbances are introduced in an unsteady manner into the boundary layer. At the same time, an apparatus for implementing the method is indicated.

The location at which the laminar-turbulent boundary layer transition takes place is dependent on various influencing factors, such as:
running length of the flow,
Reynold's number and Mach number pressure gradient,
heat transfer of the body in flow,
surface roughness and flow quality.

In investigations in, for example, wind tunnels, in which the bodies are much smaller than the full-sized version the laminar-turbulent boundary layer transition takes place at a point on the body which does not coincide with the corresponding point on the full-size model in free flight. Since the point of the laminar-turbulent boundary layer transition is involved in influencing the flow around the body, therefore on reduced bodies, that is on models, the laminar-turbulent boundary layer transition must be constrained at a certain point on the body in order to be able to transfer the results obtained with the model to the full-size version.

On full-sized versions as well, it is often desirable to constrain a laminar-turbulent boundary layer transition. This makes it possible, for example, to avoid a laminar separation. Asymmetric sheddings of vortices are also positively influenced by a constrained laminar-turbulent boundary layer transition.

A method of the type described at the beginning is known from the article "Control of laminar-instability waves using a new technique" by H. W. Liepmann, G. L. Brown and D. M. Nosenchuck, J. Fluid Mech. (1982), vol. 118, pages 187–200. There it is shown that, on a body, a plate, in water flow, a laminar-turbulent boundary layer transition can be produced if thin heating elements are attached to the surface of the body and unsteady disturbances, that is unsteady heat pulses are introduced into the flow by means of these heating elements. What is advantageous about this method is that only a small expenditure of energy is necessary. What is disadvantageous, however, is that the laminar-turbulent boundary layer transition with this method is only possible at small velocities of the flow. This is attributable to the fact that the required frequency of the unsteady disturbances increases with the velocity of the flow, but the heating elements only have a relatively low limit frequency. After exceeding this limit frequency, no unsteady disturbance takes place any longer, but rather the heating element then has, due to its inertia, a constant temperature. The investigations carried out in water by Liepmann et al are not representative for air flows, since the heat transfer from the heating element to the water is much greater than in air and, on account of the low flow velocities, the so-called Tollmien-Schlichting frequencies are very low.

The method of influencing a laminar-turbulent boundary layer transition which is customary in practice nowadays is therefore that of imparting a roughness to the body in flow, as is described, for example, in the article "Problems Associated with Artificial Boundary Layer Transition", H. U. Meier, H. -P. Kreplin, AIAA - 83 -1673. The necessary height of the roughness can in this case be determined experimentally. What is disadvantageous is that the artificial roughness of the surface produces a loss of momentum locally, which persists downstream. The effect of this loss of momentum increases, for example, considerably with retarded flow and leads to an increase in the thickness of the boundary layer. Consequently, although the position of the laminar-turbulent boundary layer transition on the model corresponds to that of the full-size version, due to the artificial thickening of the boundary layer on the model, the boundary layer development is different to that on the full-size version. Furthermore, it is disadvantageous that the height and position of the roughness imparted to the body can be optimized only for a single angle of attack and a single incoming-flow velocity, since the position of the laminar-turbulent boundary layer transition changes on the full-size version with these parameters. Also, at some points on the full-size version roughnesses are imparted, here turbulence generators, in order to avoid laminar separations. However, this has the disadvantage that the turbulence generators produce resistance.

It is known, furthermore, to produce a laminar-turbulent boundary layer transition by constant blowing-out into the laminar boundary layer. However, here too there is the disadvantage that the blowing-out in the boundary layer has the consequence of a great increasing of the thickness of the boundary layer.

SUMMARY OF THE INVENTION

The invention is based on the object of further developing a method of the type described at the beginning such that a laminar-turbulent boundary layer transition can be produced both at small and at large incoming-flow velocities while avoiding losses of momentum in the boundary layer to the greatest possible extent.

This is achieved according to the invention by the disturbances being induced by blowing-out and sucking-off and/or oscillations of the surface and/or by sound pressure. It is thus provided that, with the aid of various mechanisms, disturbances are introduced into the boundary layer, the disturbances being constantly unsteady, that is for example sinusoidal. The choice of the mechanisms, that is when blowing-out and sucking-off is performed or when the surface of the body is set in oscillations or is impinged by means of sound pressure, depends on the respective conditions present. The running length of the flow and the incoming-flow velocity are decisive in particular as criteria. However, it has been found that combining the mechanisms, that is simultaneous blowing-out and sucking-off with the oscillations of the surface of the body and with sound pressure, is particularly effective, that is the laminar-turbulent boundary layer transition can be achieved with virtually all incoming-flow velocities, flow conditions and bodies. Blowing-out and sucking-off are to be understood here as meaning that the medium flowing around the body is sucked off and subsequently the sucked-off medium is immediately blown out again. By this alternating sucking-off and blowing-out, the disturbance introduced into the boundary layer becomes unsteady as a result. In order to achieve high frequencies of the disturbances, in each case only a small quantity of the medium is blown out and sucked off. Consequently, it is also ensured that the loss of momentum of the boundary layer is avoided or can be kept very small. Oscillations of the surface of the body and sound pressure do not cause any loss of momentum, so that an artificial thickening of the boundary layer is ruled out on account of the constrained laminar-turbulent boundary layer transition. Only this makes it possible for the profile of the boundary layer on models to correspond to that of the full-size version. Furthermore, it is advantageous that neither the blowing-out and sucking-off nor the oscillations of the surface of the body nor the sound pressure are restricted to low frequencies. All these mechanisms can be operated at frequencies of several 1000 Hz, without the resultant disturbances introduced into the boundary layer becoming steady. Rather, it has been found that with a, for example, sinusoidal excitation, even at high frequencies, the disturbances in the boundary layer are also introduced sinusoidally. This ensures that the laminar-turbulent boundary layer transition can also be carried out at high incoming-flow velocities. Of course, apart from a sinusoidal excitation, a square-wave excitation may likewise take place. Other variations over time of the excitations of the disturbances are also conceivable. All that is important is that ultimately the disturbances in the boundary layer are unsteady. A particular advantage of this method also consists in that, since the laminar-turbulent boundary layer transition is constrained, a laminar boundary layer again develops by simple switching-off of the mechanisms exciting the disturbances. This may be used, for example, on aircraft on which there is the risk of a laminar boundary layer separation occurring on wings and/or tailplane during take-off and landing, while a laminar boundary layer separation is not to be feared during cruising on account of the higher speed. Rather, during cruising, an as long a laminar attachment of the boundary layer as possible is desirable, since a laminar boundary layer has a lower resistance than a turbulent one. In such a case, the laminar-turbulent boundary layer transition could be constrained in the take-off and landing phases, and thus the risk of laminar boundary layer separation avoided, while in cruising no unsteady disturbances are introduced into the boundary layer any longer, that is the turbulent boundary layer becomes laminar again, and consequently the overall resistance of the aircraft is reduced.

The disturbances may be introduced at a frequency which corresponds approximately to the respective Tollmien-Schlichting frequency or a higher frequency. The Tollmien-Schlichting frequency is in this case dependent on the respective incoming-flow velocity. For example, at an incoming-flow velocity of 20 m/sec., it is approximately 600 Hz. At higher incoming-flow velocities, the Tollmien-Schlichting frequency increases. The respective magnitude of the Tollmien-Schlichting frequency may be determined experimentally with the aid of surface heated film measurements. It is, however, also possible to choose a frequency which is far above the respective Tollmien-Schlichtung (sic) frequency, and it is thus ensured that the laminar-turbulent boundary layer transition takes place. In this case, an experimental determination of the respective Tollmien-Schlichtung (sic) frequency is not necessary.

The magnitude of the disturbances may be advantageously controlled by open-loop or closed-loop control. Consequently, it is possible that the disturbances introduced into the boundary layer can be adapted to changing circumstances, such as for example the incoming-flow velocity. This is also conceivable in the form of a control loop, in which the unsteady disturbances are either introduced into the boundary layer or not in dependence on, for instance, the flying speed of an aircraft. There is also the possibility of providing sensors at certain endangered points of the aircraft, that is for example at points on the wings or the tailplanes, which sensors indicate the occurrence of a laminar separation and, on the basis of this indication, the unsteady disturbances are introduced into the boundary layer in accordance with the method at these points.

The disturbances may advantageously be introduced quasi-pointwise. This has the effect that the laminar-turbulent boundary layer transition is only produced in a relatively closely restricted region, while outside this region there continues to be a laminar boundary layer. There is thus the possibility of constraining the laminar-turbulent boundary layer transition only to these limited regions where it is also really necessary. This is desirable in order, as already explained above, to keep the resistance of the body in flow as small as possible.

However, a multiplicity of punctiform disturbances may also be introduced, the disturbances being generated on one or more lines lying one behind the other in flow direction and arranged perpendicular or transverse to the incoming flow onto the body. This achieves the effect that the laminar-turbulent boundary layer transition is constrained downstream of the lines over the entire width of the lines. This is desirable, for example, in the investigation of aircraft wings in which there is to be a turbulent boundary layer over the entire span of the wing after a certain running length of the flow.

The apparatus for implementing the method is defined by the provision of a disturbance generator fitted into the surface of the body, by the disturbance generator having blowing-out and sucking-off devices, and/or by the provision on the disturbance generator of at least a first membrane for the generation of oscillations and-/or sound. The membrane is in this case arranged in such a way that it forms the surface of the body. This membrane may, on the one hand, be set in oscillations and serves, on the other hand, for the generation of sound. The disturbance generator has, furthermore, blowing-out and sucking-off devices, with which parts of the medium flowing around the body are sucked off and blown out again according to a predetermined frequency. In some applications it is also sufficient if the disturbance generator has only blowing-out and sucking-off devices or a first membrane for the generation of oscillations or sound. If only the generation of oscillations is provided, the first membrane may also be designed as a piezoelectric element.

The disturbance generator may have an open-loop or closed-loop control system. This makes it possible to influence both the magnitude and the frequency of the disturbances introduced into the boundary layer. Also, with this open-loop or closed-loop control system, the disturbance generator can be influenced in dependence on the respective flow present in such a way that it no longer introduces disturbances into the boundary layer or resumes its function and introduces disturbances into the boundary layer.

A second membrane may be provided on the disturbance generator, the second membrane forming the surface of the disturbance generator, then preferably an air cushion being arranged between the first membrane and the second membrane, the second membrane having one or more clearances, through which the air cushion or parts thereof can be blown out and sucked in and the first membrane being provided for the generation of sound. The first and second membranes may be designed and mutually arranged in such a way that the sound of the first membrane sets the second membrane in oscillations.

In this arrangement, the distance between the first membrane and the second membrane may be adjustable. The first membrane may be assigned a permanent ring magnet, an electromagnet and a casing and the excitation of the first membrane may then take place on the principle of a loudspeaker. There is also the possibility of exciting the first membrane by other loudspeaker systems. By such a design of the disturbance generator, it is ensured that the disturbance generator has a simple, easy-to-produce and thus inexpensive construction. The disturbance generator can also be made very small, so that the disturbances emanating from the disturbance generator are introduced quasi-pointwise. Damaging the surface of the body is only necessary at a few points, which, as far as their extent is concerned, can be kept very small. The particular advantage of this disturbance generator is also to be seen in that only very little energy has to be expended to excite the disturbances. The first membrane is, as known in the case of loudspeakers, excited and thus generates sound. This sound is transferred on the one hand to the second membrane, which is thereby set in oscillations. On the other hand, the sound is introduced through the clearances of the second membrane into the boundary layer, where it then acts as sound pressure. A, preferably, air cushion is arranged between the first membrane and the second membrane, which air cushion is blown out and sucked in again through the clearances of the second membrane on account of the oscillations of the first membrane and of the second membrane corresponding to the oscillations.

BRIEF DESCRIPTION OF THE DRAWINGS

The invention is further described with reference to preferred exemplary embodiments. In the drawing:

FIG. 3 shows a perspective representation of a body in flow, with a plurality of disturbance generators.

DETAILED DESCRIPTION

Figure 1:
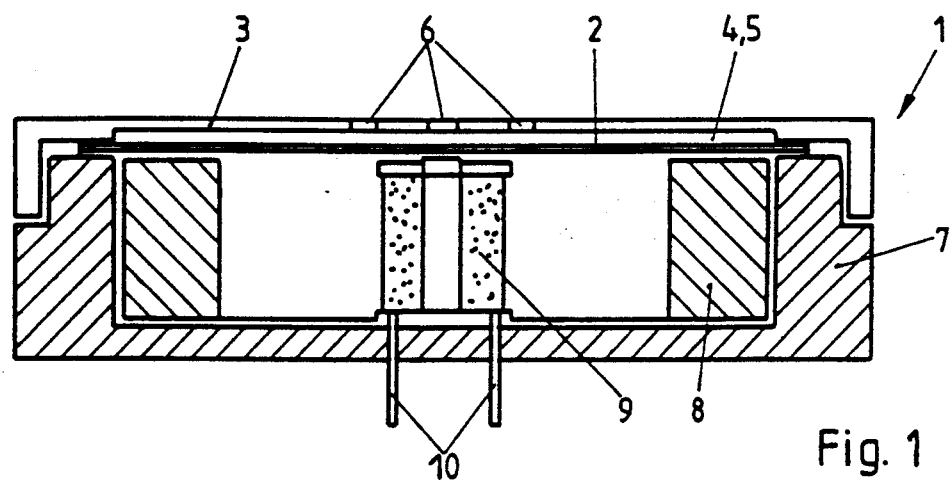
FIG. 1 shows a diagrammatic representation of a disturbance generator.

A disturbance generator 1 is shown in FIG. 1. The disturbance generator 1 has a first membrane 2 and a second membrane 3. The first membrane 2 is completely covered by the second membrane 3. Between the first membrane 2 and the second membrane 3 there is a free space 4, in which an, for example, air cushion 5 is enclosed. In the second membrane 3 there are clearances 6 provided, through which the air cushion 5 or parts thereof can pass. The first membrane 2 and the second membrane 3 are connected to a casing 7, which has a permanent ring magnet 8 and an electromagnet 9. On the electromagnet 9 there are electrical connections 10 arranged, which lead to a power supply unit (not further represented here).

Via the electrical connections 10, the electromagnet 9 is excited in such a way that the first membrane 2 is set in acoustic oscillations. The air cushion 5 in the free space 4 is blown out by the oscillations of the first membrane 2 through the clearances 6 of the second membrane 3 and sucked in again. The oscillations of the first membrane 2 transfer via the air cushion 5 to the second membrane 3, which is consequently likewise set in oscillations. With the aid of the supply unit (not shown here), the frequency and the amplitude of the oscillations can be set. The disturbance generator 1 is expediently coupled to an open-loop or closed-loop control system, which activates or de-activates the disturbance generator 1 in dependence on the respective flow conditions present and also controls the frequency and amplitude of the first membrane 2. Used as controlled variable in this case is the respective state of the flow just downstream of the disturbance generator.

Figure 2:
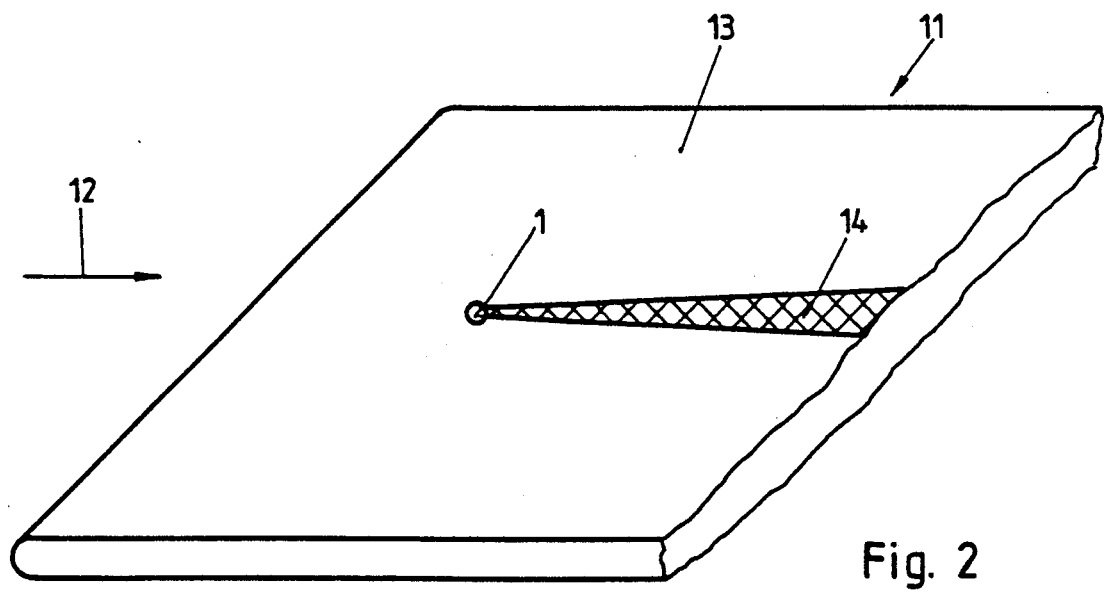
FIG. 2 shows a perspective representation of a body in flow, with a disturbance generator.

FIG. 2 shows a diagrammatic view of a body 11, around which a medium flows in the direction of an arrow 12. The disturbance generator 1 is arranged on the body 11. The disturbance generator 1 is recessed in the body 11 in such a way that the disturbance generator 1 terminates flush with a surface 13 of the body 11. After activation of the disturbance generator 1, a laminar-turbulent boundary layer transition takes place in a region 14. The region 14 has the shape of a pointed triangle, the tip of the triangle coinciding approximately with the center point of the disturbance generator 1. Outside the region 14, the boundary layer remains uninfluenced by the disturbance generator 1 and consequently laminar. The frequency at which the disturbance generator 1 introduces the disturbances into the boundary layer corresponds approximately to the Tollmien-Schlichting frequency. It is, however, also possible to choose a higher frequency.

FIG. 3 shows a body 15 which is subjected to a flow in the direction of an arrow 16. A plurality of disturbance generators 17 and 18 are arranged on the body 15. In the upper part of FIG. 3, the disturbance generators 17 are arranged on a line 19, which runs perpendicular or transverse to the incoming flow. Each disturbance generator then brings about the laminar-turbulent boundary layer transition, again in the region 14, overlapping occurring after a certain running length 20. In this case, the laminar-turbulent boundary layer transition has spread to a spanning extent 21. In the lower part of FIG. 3, as well as the disturbance generators 17 arranged on the line 19, there are also the disturbance generators 18 arranged on a further line 22. The disturbance generators 18 in this case lie behind, in flow direction, the disturbance generators 17 and are arranged offset from the latter. The regions 14 of the disturbance generators 17 and 18 intersect after a running length 23, which is substantially shorter than the running length 20. Consequently, it is possible, by arrangement of the disturbance generators 17 and 18 on the two lines 19 and 22, to produce the laminar-turbulent boundary layer transition over a spanning extent 24 after the relatively short running length 23. This arrangement is preferably used whenever a turbulent boundary layer is desired over the entire span, for example in profile measurement.

LIST OF REFERENCE NUMERALS

1 = Disturbance generator
2 = First membrane
3 = Second membrane
4 = Free space
5 = Air cushion
6 = Clearance
7 = Casing 8 = Permanent ring magnet
9 = Electromagnet
10 = Electrical connections
11 = Body
12 = Arrow
13 = Surface
14 = Region
15 = Body
16 = Arrow
17 = Disturbance generator
18 = Disturbance generator
19 = Line
20 = Running length
21 = Extent
22 = Line
23 = Running length
24 = Extent

We claim:

1. A method of generating a laminar-turbulent boundary layer transition on the surface of a body in a flow medium at selectable points, comprising introducing unsteady disturbances into the boundary layer of the medium, by alternately blowing out and sucking off parts of the medium flowing adjacent the surface of the body and introducing the disturbances at a frequency which corresponds approximately to a respective Tollmien-Schlichting frequency dependant from the velocity of the flow of the medium adjacent the surface of the body.

2. The method as claimed in claim 1, wherein the step of introducing unsteady disturbances into the boundary layer of the medium comprises introducing a multiplicity of punctiform disturbances into the boundary layer on one or more lines (19, 22) lying one behind the other in flow direction of the flow medium and arranged transverse to the flow direction.

3. An apparatus for generating a laminar-turbulent boundary layer transition at the surface of a body (11, 15) in a flowing medium comprising a disturbance generator including an outer membrane (3) coextensive with the surface of the body and an inner membrane (2) fitted into the surface (13) of the body (11, 15), said outer membrane defining means for passing the flow medium therethrough, and means for vibrating said inner membrane for inducing vibrations of said outer membrane and inducing movements of the medium through the outer membrane for the generation of oscillations in the boundary layer of the flowing medium adjacent the surface of the body in the flowing medium.

4. The apparatus as claimed in claim 3, wherein an air cushion (5) is arranged between the inner membrane (2) and the outer membrane (3), wherein said outer membrane (3) has at least one clearance (6) through which the air within the air cushion (5) can be blown out and sucked in through said outer membrane.

5. The apparatus as claimed in claim 4, wherein the first and second membranes (2,3) are designed and mutually arranged in such a way that the sound of the first membrane (2) sets the second membrane (3) in oscillations.

6. The apparatus as claimed in claim 5, wherein a permanent ring magnet (8) is mounted adjacent said inner membrane, an electromagnet (9) is positioned adjacent said inner membrane within the circular confines of said ring magnet and a casing (7) surrounds said ring magnet and supports said inner and outer membranes over said ring magnet and said electromagnet, and wherein the excitation of the inner membrane (2) by said ring magnet and said electromagnet causes the inner membrane (2) to oscillate so as to generate sound waves which cause the outer membrane (3) to oscillate.

7. A method of influencing a laminar turbulent boundary layer transition on a body in a flow medium comprising:
oscillating a portion of the surface of the body defining an opening therein at the boundary layer and alternately blowing out and sucking off parts of the medium flowing about the body through the opening at the boundary layer to create unsteady disturbances, and introducing the disturbances at a frequency which corresponds approximately to a respective Tollmien-Schlichting frequency dependant from the flow of the medium adjacent the surface of the body.

8. The method of claim 7 and wherein the step of oscillating a portion of the surface of the body defining an opening therein comprises oscillating a second surface adjacent the portion of the body to oscillate an air cushion in the space between the second surface and the portion of the body, and oscillating the portion of the body with the oscillating air cushion.

9. The method of claim 8 and wherein parts of the oscillating air cushion are blown out and sucked in through the opening in the body.

10. The method of claim 8 and wherein the step of oscillating the second surface comprises inducing vibrations in the second surface with an electromagnetic field.

11. The method of claim 8 and further including the step of generating sound with the second surface.

12. The method of claim 7 and wherein the step oscillating a portion of the surface of the body comprises oscillating the portion of the surface at a frequency which corresponds approximately at least as high as the respective Tollmien-Schlichting frequency dependent on the incoming flow velocity.

13. The method of claim 7 and wherein the step of oscillating a portion of the surface of the body comprises oscillating a first plurality of portions of the surface of the body arranged in a first line on the surface of the body extending across the flow direction.

14. The method of claim 13 and wherein the step of oscillating a portion of the surface of the body comprises oscillating a second plurality of portions of the surface of the body arranged in a second line behind the first line on the surface of the body.

15. Apparatus for influencing a laminar-turbulent boundry layer transition on bodies in flow comprising:
a disturbance generator fitted into the surface of the body with a surface membrane substantially flush with the surface of the body, an opening formed in said surface membrane, and means for alternately blowing out and sucking in air through said opening.

16. The apparatus of claim 15 and wherein said means for alternately blowing out and sucking in air through said opening comprises means for oscillating said surface membrane.

17. The apparatus of claim 15 and further including in an inner membrane positioned parallel to and closely spaced from said surface membrane and defining an air cushion therebetween, and wherein said means for alternately blowing out and sucking in air through said opening comprises means for oscillating said inner membrane which induces the oscillation of the cushion of air and said surface membrane.

18. The apparatus of claim 17 and wherein said means for oscillating said inner membrane comprises electromagnetic means for oscillating said inner membrane.

19. The apparatus of claim 17 and wherein said means for oscillating said inner membrane comprises means for oscillating said inner membrane at a sound generating frequency.

20. The apparatus of claim 19 and wherein said surface membrane and said inner surface are constructed and arranged such that the sound produced by the oscillation of said inner membrane sets the surface membrane in oscillation.

21. The apparatus of claim 19 and further including a permanent magnet surrounding an electromagnet adjacent said inner membrane, whereby excitation of said electromagnet generates a sound from said inner membrane.

* * * * *